April 13, 1965 C. E. NORTON 3,178,047
PIPE CONVEYING DEVICE
Filed Oct. 12, 1962 2 Sheets-Sheet 1

INVENTOR.
CHARLES E. NORTON
by Henry Kozak
ATTORNEY

April 13, 1965     C. E. NORTON     3,178,047
PIPE CONVEYING DEVICE

Filed Oct. 12, 1962     2 Sheets-Sheet 2

INVENTOR.

CHARLES E. NORTON
by Henry Kozak
ATTORNEY

United States Patent Office 3,178,047
Patented Apr. 13, 1965

3,178,047
PIPE CONVEYING DEVICE
Charles E. Norton, Chicago, Ill., assignor to National Castings Company, Cleveland, Ohio, a corporation of Ohio
Filed Oct. 12, 1962, Ser. No. 230,053
12 Claims. (Cl. 214—339)

This invention relates to a device for conveying a pipe or other elongate article of cylindrical outer surface in a lengthwise direction while also rotating the pipe about its longitudinal axis. The invention relates particularly to a device which may be driven by a rectiform drive-shaft extending through a plurality of such devices.

Heretofore, equipment in prevailing use for conveying pipe in rotating end-to-end arrangement such as required, e.g., in a wrapping and coating process, has comprised a series of turntables, each having two wheels arranged along parallel axes of rotation in axially-offset, radially overlapping relationship and acting to cradle and advance the pipe longitudinally. To vary the cant of the wheels relative to the pipe path, a major part of each turntable is rotated about a vertical axis including its driving sprocket or pulley and other sprockets or shives driven thereby fixed for rotating the pipe advancing wheels. Such a system requires a driveline comprising components such as universal joints, a plurality of drive shafts, and sliding spline connections. In some installations, conveying is partially performed by track and dolly conveyors entailing more complicated lift-off devices than required in the use of the present invention.

Hence, it is an important object of this invention to provide a device of the type for rotating and advancing a pipe lengthwise of itself, in what may be described as helical motion, having simplified construction and greatly contributing to the simplicity of equipment comprising plurality of such devices.

A further object is to provide a turntable type device adjustable to various angular relationships of the wheels with the pipe path, and utilizing a belt drive connecting a rotary power source of fixed axis to the pipe-propelling wheels of the device.

Still another object is to provide the foregoing turntable device with mechanism adapting it to be readily adjusted to changes in the rate of pipe travel thereover desired and establishing desired rates of pipe travel in accordance with different sizes of pipe passed thereover.

Broadly speaking, this invention consists of a device for simultaneously rotating and conveying a pipe lengthwise of itself comprising a stand; a platform rotatably mounted thereon for rotation about a vertical axis; a pair of pipe-engaging wheels supported by the platform with respective, generally horizontal, parallel axes of rotation disposed on opposite side of the vertical axis; each wheel having a pulley associated therewith in fixed coaxial relationship and so disposed that a circumference of the belt-receiving periphery of the pulley is contained within a plane containing the vertical axis of the platform and a like circumference of a pulley similarly associated with the other wheel. The device further comprises a horizontal drive shaft rotatably mounted in the stand in approximately intersecting relation with the vertical axis; a drive pulley fixed on the shaft at approximately its intersection with the vertical axis; a belt extending around the wheel pulleys and the shaft pulley; and a pair of idler pulleys and a support for each pulley projecting upwardly from the platform adjacent the vertical axis to maintain the pulley against a section of the belt extending between the drive pulley and one of the wheel pulleys.

Each idler pulley support is articulated to provide relatively moving parts enabling the idler pulley to tilt in response to twisting of the belt about its longitudinal axis as the wheel pulleys are moved out of the vertical plane of the driving pulley circumference.

In the drawing in respect to which the invention is described below:

FIG. 5 is an elevation of another type of idler pulley and support assembly as viewed transversely of the pulley axis with a pivotal joint of the pulley mounting cut away to expose bearing structure.

FIG. 6 is another elevation of the pulley-and-support assembly shown in FIG. 5 as viewed parallel to the axis of the pulley.

Figure 1:
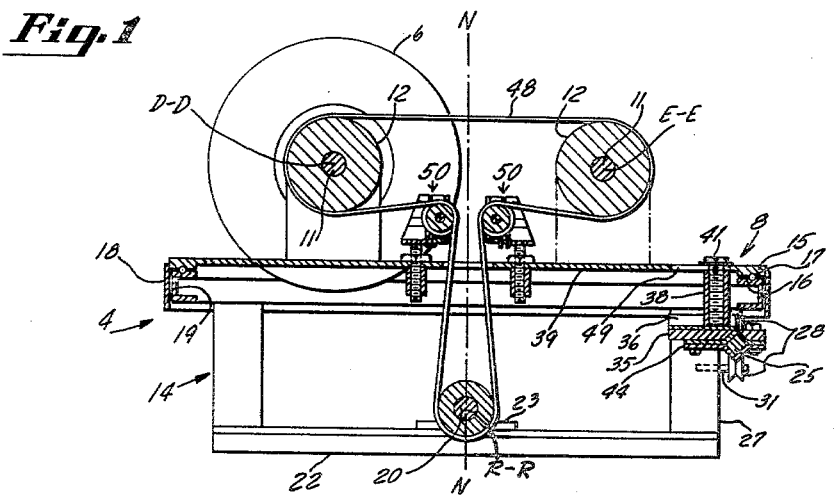
FIG. 1 is an elevation in section taken along line A—A of FIG. 3 in respect to its upper platform portion and along line B—B of FIG. 3 in respect to its lower stand portion.
Figure 2:
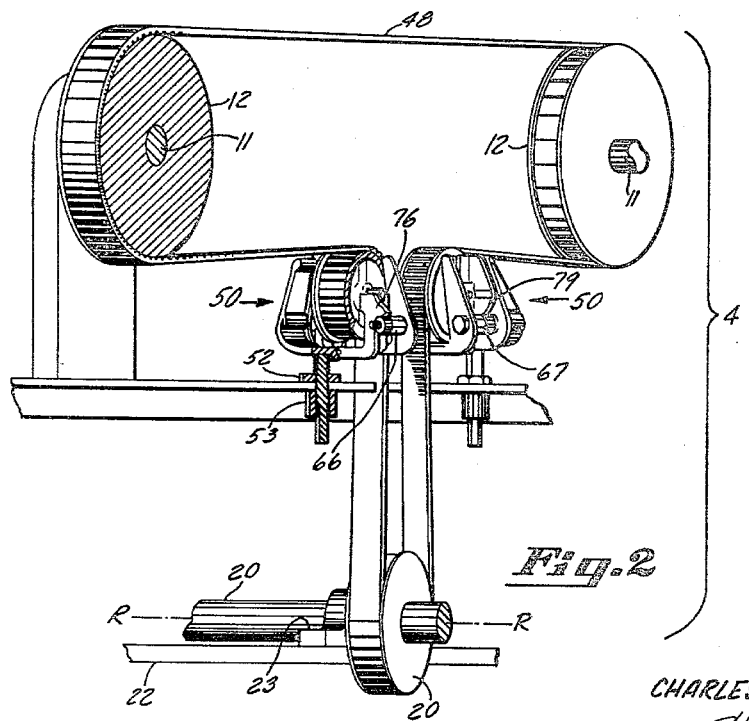
FIG. 2 is a perspective fragmentary view of the turntable device shown in FIGS. 1 and 3 with some parts deleted and other sectioned.
Figure 3:
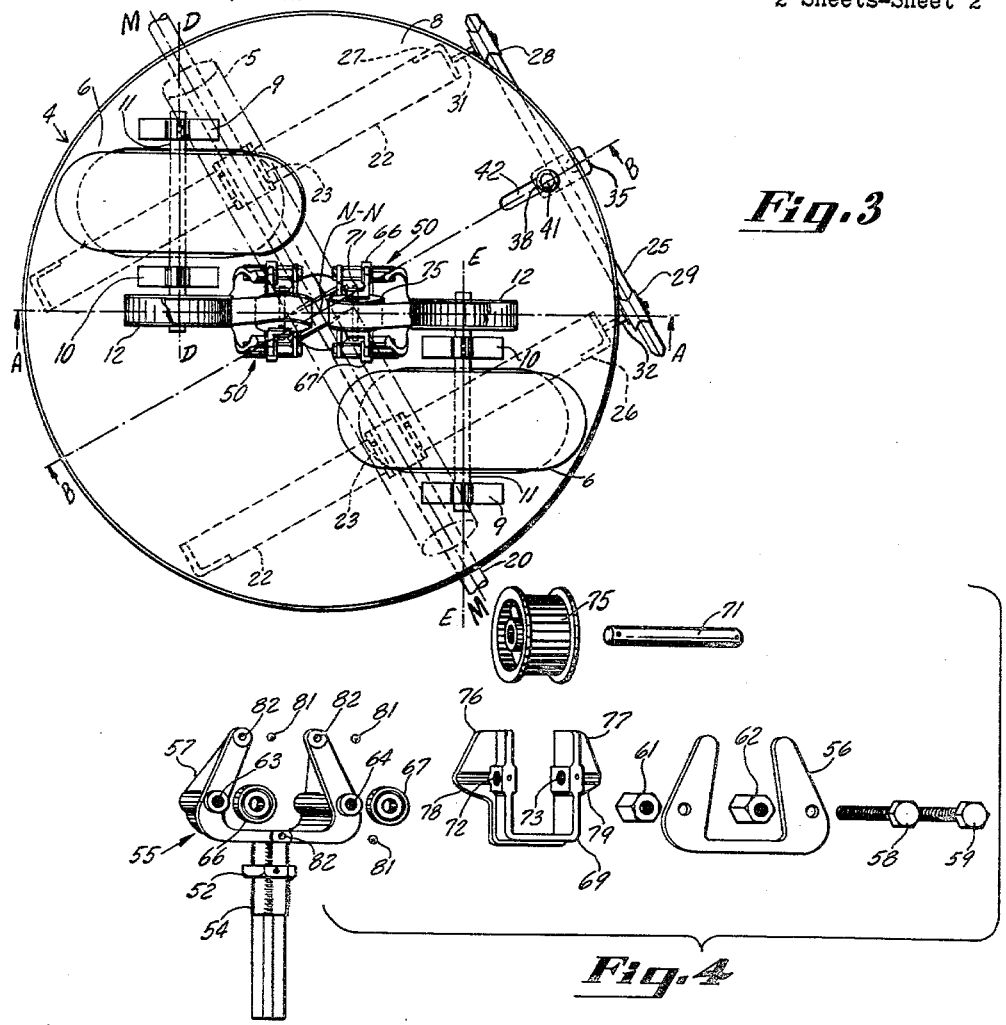
FIG. 3 is a plane view of the device of the turntable device illustrated in FIGS. 1 and 2.

FIGS. 1, 2, and 3 are various views of a turntable device 4 functioning generally to propel a pipe 5 along a path M—M through rotation of the pipe as its rests upon a pair of wheels 6 of each of a series of such devices. In addition to these wheels, the device comprises a platform 8 having bearings 9 and 10 receiving respective wheel shafts 11. Each shaft 11 has a driven pulley 12 fixed thereto with a circumference of its belt-receiving pulley contained within a vertical plane A—A containing also a vertical axis N—N of the device.

Further components of the device 4 are a stand 14 constructed generally concentrically relative to the axis N—N to provide rotatable support for the platform 8 through a bearing constituting an upper race 15 forming a portion of the platform 8, a lower race 16 forming a portion of the stand 14 and a plurality of balls 17 received in grooves formed along the opposing surfaces of the races. The stand 14 further comprises a drive shaft 20 disposed in an approximate manner within the stand with its axis horizontal and in intersecting relation with the vertical axis N—N. The shaft 20 is supported by cross-members 22 and bearings 23 attached to these members.

A dust shield 18 is attached along the outer periphery of the platform 8 to extend downwardly past the clearance between opposing surfaces of the races 15 and 16 to overlap an outer circular wall portion 19 of the stand.

The device 4 also includes mechanism for establishing different angular positions of the platform relative to the stand 14 and the axis N—N.

In the embodiment shown, a rod 25 of square cross section is supported by the stand 14 along the underside of the platform 8 radially exteriorly of a pair of posts 26 and 27 by two pairs of pulleys 28 and 29 mounted on trunnions 31, 32. The pulleys 28 and 29 have right-angle grooves which conform them to the periphery of the square rod. Thus, when the pulleys 28 and 29 are mounted on respective trunnions without opportunity for end-play, the square rod is held from twisting about its longitudinal axis during platform adjusting movements in its lengthwise direction.

The rod 25 has fixed to it a transverse arm 35 providing an upward-facing groove 36 for receiving a crankpin 38 attached to the disk portion 39 of the platform 8. The crankpin is secured to the platform by a capscrew 41 along a slot 42 respective to which it is adjustable. The arm 35 may be clamped, as shown, by a cleat 44 and the capscrews extending therethrough into the arm. Thus, as the rod 25 is moved in a longitudinal direction, the transverse arm 35 causes the crankpin to slide to a corresponding extent along the groove 36 to effect rotation of the platform 8 relative to the stand 14. This relationship of the arm 35 and the crankpin 38 may be likened to that of a cam and cam-follower, respectively.

The wheels 6 are rotated when their respective pulleys are driven by a belt 48 driven in turn by the pulley 20. The maintenance of this drive relationship at different adjustments of the platform relative to the stand is made possible through a pair of idler pulley-and-support assemblies 50 of special design. The idler pulleys herein provided are supported in a manner permitting tilting in response to twisting of the belt 48 about its longitudinal axis as the plateform is shifted in directions which carry the vertical plane A—A of the wheel pulleys out of perpendicular relationship with the axis R—R of the drive shaft 22.

Figure 4:
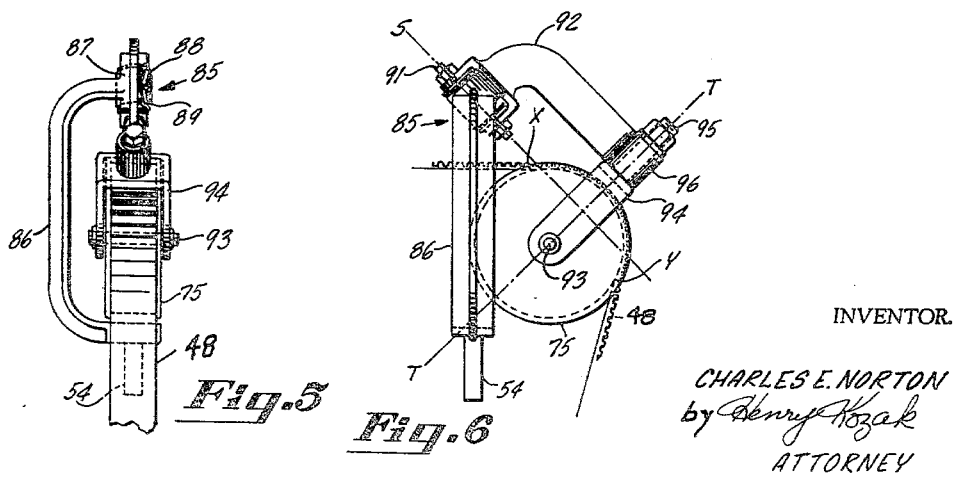
FIG. 4 is a perspective exploded view of the various parts constituting one form of idler pulley-and-support assembly shown assembled in FIGS. 1 to 3.

FIG. 4 illustrates an assembly 50 in exploded view. This assembly comprises a supporting frame constituted of a base 55 normally fixed to the platform by a pair of nuts 52 and 53 in threaded relation with the shank 54 of the base 55, and a yoke 56 supported in fixed horizontal relation with a yoke portion 57 of the base by a pair of capscrews 58 and 59. A pair of nuts 61, 62 maintains the yoke 56 tightly against the heads of the capscrews. The threaded ends of the capscrews are received in threaded apertures 63, 64 of the base 55. Supported on the capscrews between the nuts 61, 62 and the yoke portion 57 are bearings 66 and 67. Since the bolts 58, 59 are normally threaded over a substantial portion of their length, the bearings 66 and 67 are preferably of an anti-friction type having a non-rotatable inner race fitting over threads of the capscrews.

The pulley support just described is adapted for loosely cradling within the open region defined by the yoke 56, the yoke portion 57, and the bearings 66, 67, a unit or sub-assembly comprising a U-shape sash 69, a pin 71 ordinarily extending through bores 72 and 73 of both legs of the sash and bridging the space between the legs, and a pulley 75 carried as shown in FIGS. 1 to 3 on the pin 71 within the sash. The sash has ears 76 and 77 providing arcuate undersurfaces 78 and 79, respectively, having a common radius of curvature. The side of the sash facing away from the foreground in FIG. 4 lies normally in a generally vertical plane adapting it to rest against anti-friction balls 81 which, when received in apertures 82 of the base, function as anti-friction bearings. The sash 69 with the pin 71 and pulley 75 carried therein is seated on the bearings 66 and 67 by engagement of the arcuate surfaces 78, 79 therewith. The assembled sash and pulley are thus enabled to turn with ease as a unit in a vertical plane containing both bearings.

During operation, the belt 48 extends along an approximately right angle path around the pulley 75 to force the sash against the balls 81. The pulley 75 is thus free to tilt within the support frame comprising the base 55 and other parts fixed thereto in response to forces exerted on the pulley by the belt. Tilting of the axis of pulley 75 away from the horizontal is effected in proportion to the angle through which plane A—A of the wheel pulleys 12 is shifted from plane B—B of the driving pulley 20.

FIGS. 5 and 6 illustrate a support for the idler pulley 75 providing universal pivoting of the pulley in response to shifts of position of the belt 48 relative to its longitudinal axis as the platform is rotated to different positions on its supporting stand 14. The support 85 comprises a C-shaped bracket 86 having stem 54 similar to that of the base 55 and terminating at its upper end in a sleeve 87 for housing roller bearings 88, 89 which in turn receive a pin 91 to complete the pivotal joint which connects the bracket 85 with an L-shaped bracket 92. The pulley 75 is rotatably supported on the pin 93 of the clevis 94. The latter also comprises a stem 95 in pivotable bearing relation with the cylindrical bearing portion 96 of the bracket 92. As shown in FIG. 6, the belt 48 engages the pulley 75 along an arc extending from point X to point Y. For satisfactory response of the pulley to aligning forces imposed therein by the belt, the axis S—S of the pivotal joint connecting brackets 86 and 92 preferably extends through, and subtends a portion of, the arc of belt contact with the pulley 75. While not critical, the desired location of this axis within this arc will depend, e.g., upon the weight of the pulley and the tensile force running longitudinally of the belt from the pulley 75 to the pulleys 12 and 20, and the tilting force imposed on the pulley by the twisting of the belt on its longitudinal axis. The tilting of the pulley is also facilitated by its freedom to turn on the axis T—T which passes approximately through the axis of rotation of the pulley and through the middle of the arc of the belt contact. To be noted is that the axes T—T and S—S intersect within the geometric area described by the arc of the belt contact and a chord connecting the extremities of this arc. Such an arrangement of these axes results in a satisfactory sensitivity of the pulley pivotally reacting along both axes S—S and T—T to the changes of force exerted thereon by the belt as the platform is adjusted for higher or lower pipe advancing speeds.

From the foregoing description of the device 4 it will be obvious that a plurality of such devices may be spaced along a common rectilinear drive shaft including the shaft 20. When so arranged, it is further evident that the platform adjusting mechanism may be integrated by a long bar comprising the square bar 25 extending parallel to a common drive shaft from stand to stand.

The terms and expressions which have been employed are used as terms of description and not of limitation and there is no intention of excluding such equivalents of the invention described, or of the portions thereof, as fall within the scope of the claims.

What is claimed is:

1. A turntable device for conveying a pipe lengthwise of itself while rotating it about its longitudinal axis comprising:
    (A) a stand;
    (B) a platform supported by said stand for rotation relatively thereto about a vertical axis;
    (C) a drive shaft rotatably mounted in said stand with its axis of rotation in fixed generally-horizontal, approximately-intersecting relation with said vertical axis;
    (D) a drive pulley fixed concentrically on said shaft in approximate alignment with said vertical axis;
    (E) a pair of pipe engaging wheels supported by the platform with respective axes of rotation in generally horizontal, parallel relationship and on opposite sides of the vertical axis;
    (F) a pair of driven pulleys, each fixed in coaxial relation with one of said wheels with a circumference of a belt-receiving periphery thereof disposed generally within a plane containing said vertical axis and a like circumference of the other drive pulley;
    (G) a belt extending around both driven pulleys and the drive pulley; and
    (H) a pair of idler pulleys and means projecting upwardly from the platform for supporting each idler pulley adjacent said vertical axis against a section of the belt extending between said drive pulley and each of said driven pulleys;
        said idler pulley supporting means comprising pivotal means enabling tilting of each idler pulley in response to twisting the belt relative to its longitudinal axis.

2. A turntable device for conveying a pipe lengthwise of itself while rotating it about its longitudinal axis comprising:
    (A) a stand;

(B) a platform supported by said stand overhead thereof for rotation relative thereto about a vertical axis;

(C) a drive shaft rotatably mounted in said stand below the platform with its axis of rotation in fixed generally-horizontal approximately-intersecting relation with said vertical axis;

(D) a drive pulley fixed concentrically on said shaft in approximate alignment with said vertical axis;

(E) a pair of pipe-engaging wheels supported by the platform with respective axes of rotation in generally horizontal parallel relationship and on opposite sides of the vertical axis;

said wheel axes being relatively spaced, and said wheels being relatively axially offset to dispose the peripheries of the wheels in radially overlapping relationship;

(F) a pair of driven pulleys, each in fixed coaxial relation with one of said wheels with a circumference of its belt-receiving periphery generally within a plane containing said vertical axis;

(G) a pair of idler pulleys, one for each driven pulley;

(H) means for supporting each idler pulley in said vertical plane of the associated driven pulley with a portion of said periphery facing away from the associated pulley disposed closely adjacent to said vertical axis;

said supporting means comprising relatively movable parts enabling tilting of the idler pulley in a direction transverse to belt travel thereover;

each idler pulley being supported with the upward facing portion of its periphery disposed below a line tangent to upwardly facing portions of both driven pulleys; and (I) a belt extending along said line and partly around both driven pulleys, then over said peripheral portions of the idler pulleys, and around the underside of said driving pulley.

3. The turntable device of claim 2 wherein:

the stand and the platform are generally circular and concentric with respect to said vertical axis and comprise:

(1) arcuate bearing means concentric to said axis in opposed vertically-facing relationship; and (2) means for maintaining coaxial relationship thereof.

4. The turntable device of claim 3 wherein:

(1) the means for maintaining coaxial relationship of the stand and platform comprises grooves in the opposing faces of said races which are in vertical registry and concentric to said axis; and (2) rolling elements received in said arcuate grooves.

5. The turntable device of claim 2 comprising:

(A) a bearing in concentric relation with said vertical axis, said bearing comprising:

upper and lower races in opposed vertical registry attached to the platform and the stand respectively;

said bearing comprising means for maintaining the platform and the stand in coaxial relationship.

6. The turntable device of claim 5 comprising:

a circular flange forming the outer periphery of the platform and extending downwardly past both races of the bearing as a dust shield.

7. The turntable device of claim 2 wherein:

the platform and the stand are generally circular and concentric to said vertical axis and the device comprises:

(A) a reciprocable control member and means on the stand supporting the member underneath the platform for horizontal movement in a direction parallel to said drive shaft; and (B) crankpin and guide means connecting the platform with the control member causing the platform to rotate as the control member moves in said direction.

8. The turntable device of claim 2 wherein:

said means supporting the idler pulley comprises a universal joint affording universal tilting movements of the idler pulley.

9. The turntable device of claim 2 wherein:

the surface of the belt engaging said drive pulley and the driven pulleys is of toothed conformation and the belt-receiving surfaces of said pulleys are complementarily notched.

10. The turntable device of claim 2 wherein:

said means supporting the pulley comprises:

(1) a supporting bracket comprising horizontally spaced rollers on parallel horizontal axes;

(2) a pulley block having laterally extending ears with arcuate undersurfaces approximately described by a common radius in engagement with said rollers;

said pulley being supported in the block with its axis of rotation in transverse relation with the ears and parallel to a plane swept by said radius;

the bracket and the block being open to maintain a belt path changing at least 90° in extending around said pulley;

said bracket and block having opposed vertical guide surfaces facing in directions parallel to said roller axes.

11. The turntable device of claim 10 comprising:

anti-friction bearing means interposed between said vertical guide surfaces.

12. The turntable device of claim 2 wherein:

the means for supporting the pulley comprises a mechanism providing universal angling movement of said pulley in adjusting to a twisted condition of the belt;

said mechanism comprising a pivotal joint in the supporting means pivoting along an axis passing approximately through the pulley axis and a mid-point in the arc of belt contact with the pulley;

another pivotal joint pivoting along an axis extending in chordal relationship with, and through, said arc.

References Cited by the Examiner

UNITED STATES PATENTS

| | | | |
|---|---|---|---|
| 1,555,556 | 9/25 | Cumner et al. | 74—242.15 X |
| 2,525,305 | 10/50 | Lombard | 251—74 |
| 2,900,831 | 8/59 | Wilson et al. | 74—216.5 |

HUGO O. SCHULZ, *Primary Examiner.*